(12) United States Patent  
Kubodera et al.

(10) Patent No.: US 8,306,575 B2  
(45) Date of Patent: Nov. 6, 2012

(54) ELECTRONIC DEVICE WITH CONFIGURABLE DISPLAYS

(75) Inventors: Takayuki Kubodera, Kanagawa (JP); Etsuko Kuse, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 739 days.

(21) Appl. No.: 12/209,150

(22) Filed: Sep. 11, 2008

(65) Prior Publication Data

US 2009/0075702 A1  Mar. 19, 2009

(30) Foreign Application Priority Data

Sep. 14, 2007  (JP) ................................. 2007-238629

(51) Int. Cl.
*H04M 1/00* (2006.01)
(52) U.S. Cl. .................. 455/566; 455/550.1; 455/575.1; 455/575.3; 455/575.4; 379/428.01; 379/433.01; 379/433.04; 379/433.12; 379/433.13
(58) Field of Classification Search ............... 455/550.1, 455/566, 575.1, 575.8, 575.3, 575.4; 379/433.01, 379/433.04, 433.11–433.13, 428.01
See application file for complete search history.

(56) References Cited

U.S. PATENT DOCUMENTS

| 7,492,892 | B2* | 2/2009 | Lee et al. ................. 379/433.12 |
| 7,599,723 | B2* | 10/2009 | Lee et al. ................... 455/575.4 |
| 7,643,857 | B2* | 1/2010 | Yang et al. ................. 455/575.4 |
| 7,856,251 | B2* | 12/2010 | Park et al. ...................... 455/566 |
| 2006/0066769 | A1* | 3/2006 | Minaguchi et al. ............. 349/58 |
| 2007/0164923 | A1* | 7/2007 | Kanai et al. ..................... 345/1.1 |
| 2009/0035056 | A1* | 2/2009 | Kim et al. ...................... 403/326 |

FOREIGN PATENT DOCUMENTS

| JP | 2000184026 | 6/2000 |
| JP | 2003298700 | 10/2003 |
| JP | -2007-079157 | 3/2007 |
| JP | 3139121 | 1/2008 |

* cited by examiner

*Primary Examiner* — Raymond Dean
(74) *Attorney, Agent, or Firm* — Duane Morris LLP; Richard C. Kim

(57) ABSTRACT

An electronic device includes at least two display casings each having a display therein, a connecting member comprising two rotation shafts arranged in parallel to each other and coupled to respective ones of the two display casings so as to allow each of the two display casings to rotate, and a sliding mechanism configured to allow the two display casings to move toward each other so as to allow the displays of the two display casings to form a single larger display area.

24 Claims, 8 Drawing Sheets

ELECTRONIC DEVICE WITH CONFIGURABLE DISPLAYS

CROSS-REFERENCE TO RELATED APPLICATIONS

The present application claims priority under 35 U.S.C. §119 to Japanese Patent Application No. 2007-238629, filed Sep. 14, 2007. The content of this application is incorporated herein by reference in its entirety.

BACKGROUND OF THE INVENTION

1. Field of the Invention

The present invention relates to electronic devices having a plurality of display-containing casings connected with each other in a foldable manner.

2. Description of the Related Art

Recently, the size and weight of electronic devices, represented by mobile phones, personal handy phone systems (PHSs), personal digital assistants (PDAs), and mobile personal computers (PCs), have been reduced and functions thereof have also been enhanced. Such a reduction in the size and weight of electronic devices has led to corresponding reductions in the size of the displays used in such devices, as well as control circuitry within the device that controls the operation of the displays, among other functions.

In such electronic devices, for example, a display-containing casing and an operation-unit-containing casing are engaged with each other by a rail, a hinge, a bearing, or the like and have various forms, such as a slidable form, a foldable form, and a rotatable form.

Due to enhancements in the performance of an image-pickup devices (e.g., a camera) as well as increases in the size of memory devices, the number of image pixels capable of being captured has increased significantly in recent years. Today, the functionality of a display is not limited to displaying only character information. For example, displays utilized in portable electronic devices can also be utilized to view television programming (such as one-segment broadcasting) or to browse internet web sites. Accordingly, to display images containing large quantities of pixel data or other information, a further increase in the size of displays used in portable electronic devices, without necessarily or significantly increasing the overall size of the portable electronic device, is desired.

BRIEF SUMMARY OF THE INVENTION

The invention addresses the above and other needs by providing an electronic device that includes at least two display areas that may be moved together to form a single larger display area.

In one embodiment of the invention, an electronic device includes: two display casings each having a display contained therein; a connecting member that includes two rotation shafts arranged in parallel to each other and coupled to respective ones of the two display casings so as to allow each of the two display casings to rotate; and a sliding mechanism configured to allow the two display casings to move toward each other so as to allow the displays of the two display casings to form a single larger display area.

In a further embodiment, the electronic device further includes a mechanism for providing a force upon the two display cases such that they are urged toward one another.

In another aspect of the invention, each of the two display casings include at least one hole portion for storing and hiding respective portions of the connecting member when the electronic device is in a fully open state and the two display casings are connected together so that their respective displays form the larger display area.

In another embodiment, the electronic device further includes: a stored state detecting unit that detects whether the connecting member is stored in the display casings; and a controlling unit that controls ON/OFF of a power supply or an operating application of the electronic device in accordance with the stored state.

In one embodiment, the displays contained in the two display casings include touch sensitive panels.

In a further embodiment, the electronic device further includes: a protecting member coupled to respective outside surfaces of the two display casings, wherein the outside surfaces are opposite the display surfaces of each display casing, respectively, and the protecting member comprises a flexible material that flexes when the two display casings are moved with respect to one another as the electronic device is switched between closed and open configurations.

BRIEF DESCRIPTION OF THE DRAWINGS

The present disclosure, in accordance with one or more embodiments, is described in detail with reference to the following figures. The drawings are provided for purposes of illustration only and merely depict typical or exemplary embodiments of the disclosure. These drawings are provided to facilitate the reader's understanding of the disclosure and shall not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS OF THE INVENTION

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

In one embodiment, a foldable electronic device includes two displays contained in two respective display casings. The two display casings are movably connected to each other such that they may rotate or pivot with respect to each other to provide open and closed configurations for the electronic device. In an open configuration, the two displays casing are further movable to slidably engage or contact each other such that their respective displays are positioned immediately adjacent to one another, thereby combining their display areas to form a single larger display area. Although an exemplary embodiment of the invention is described herein in the context of a mobile phone, it is understood that the invention may be utilized or embodied in many other types of electronic devices.

Figure 1:
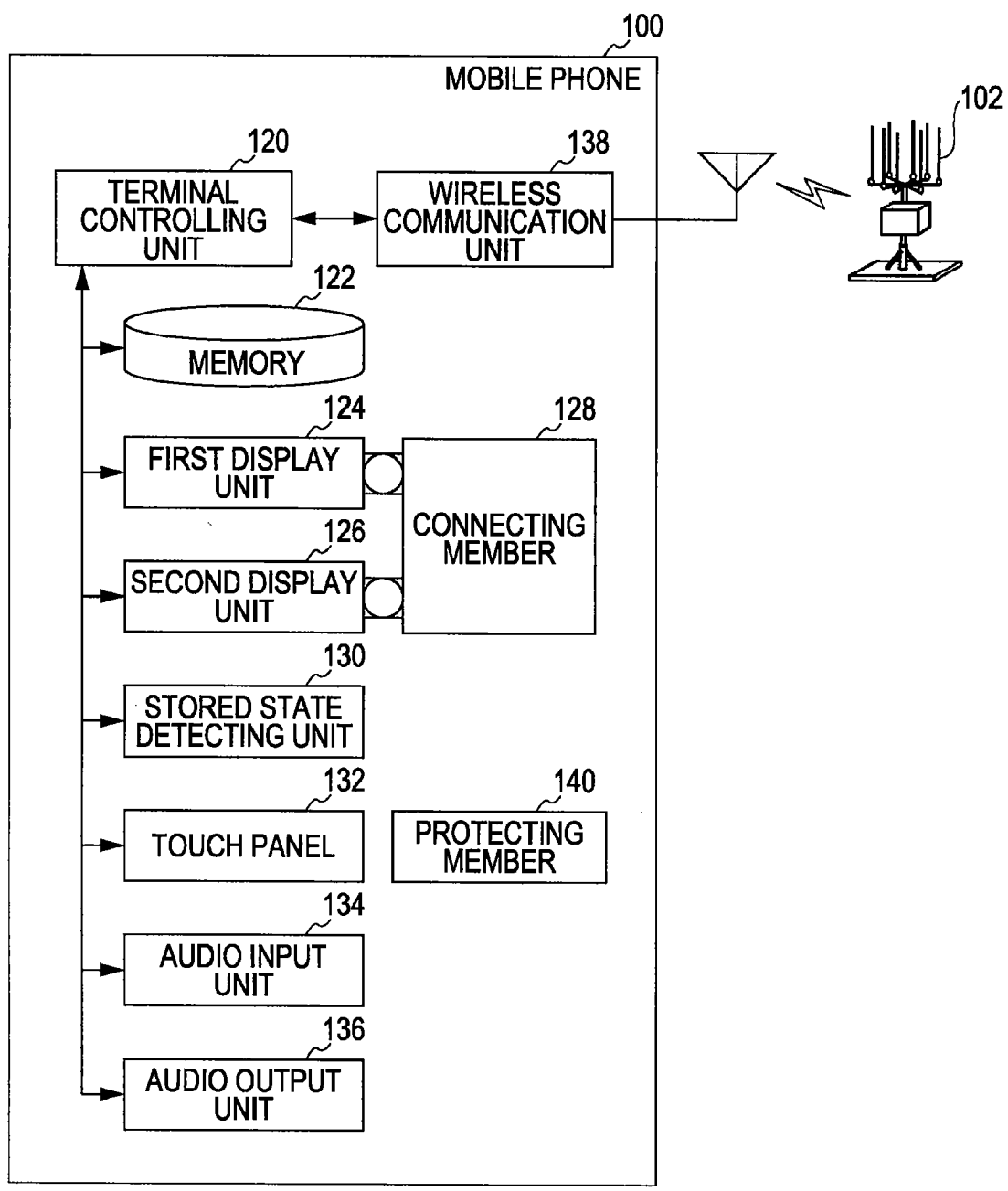
FIG. 1 is a block diagram of an exemplary mobile phone, in accordance with one embodiment of the invention.

FIG. 1 illustrates a block diagram of an exemplary mobile phone 100 in accordance with one embodiment of the invention. The mobile phone 100 includes a terminal controlling unit 120, a memory 122, a first display 124, a second display 126, a connecting member 128, a stored state detecting unit 130, a touch panel 132, an audio input unit 134, an audio output unit 136, a wireless communication unit 138, and a protecting member 140.

The terminal controlling unit 120 manages and controls the entire mobile phone 100 using a semiconductor integrated circuit that includes a central processing unit (CPU). Using programs stored in the memory 122, the terminal controlling unit 120 executes various applications or functions, such as a talk function, a character input function, a music playback function, and a TV viewing function, for example.

The memory 122 may be a read-only memory (ROM), a random access memory (RAM), an electrically erasable programmable ROM (EEPROM), a nonvolatile RAM, a flash storage unit, or a hard disk drive (HDD). The memory 122 stores programs processed by the terminal controlling unit 120 and other data files.

In one embodiment, each of the first and second displays 124 and 126 include a liquid crystal display. For example, the first and second displays 124 and 126 may be an electroluminescence (EL) or a plasma display panel (PDP). The first and second displays 124 and 126 can display graphical user interfaces (GUIs) of a Web browser, a schedule management, and applications stored in the memory 122 of the mobile phone 100, or provided by an application server (not shown) via a communication network. In one embodiment, the first and second displays 124 and 126 in cooperation with the touch panel 132 may provide a touch sensitive input interface, as described in further detail below. Such an input interface can provide, for example, graphical operation keys, such as a keypad, and arrow keys, etc., through operation blocks 150 (see FIG. 2) as described in further detail below. Each set of graphical operation keys or type of key may be assigned a particular area or section of the display depending on each particular application. In this manner, it is possible to provide a large screen without hindering or decreasing the functionality of traditional input interfaces. To the contrary, additional functionality may be provided by the present invention.

Figure 2:
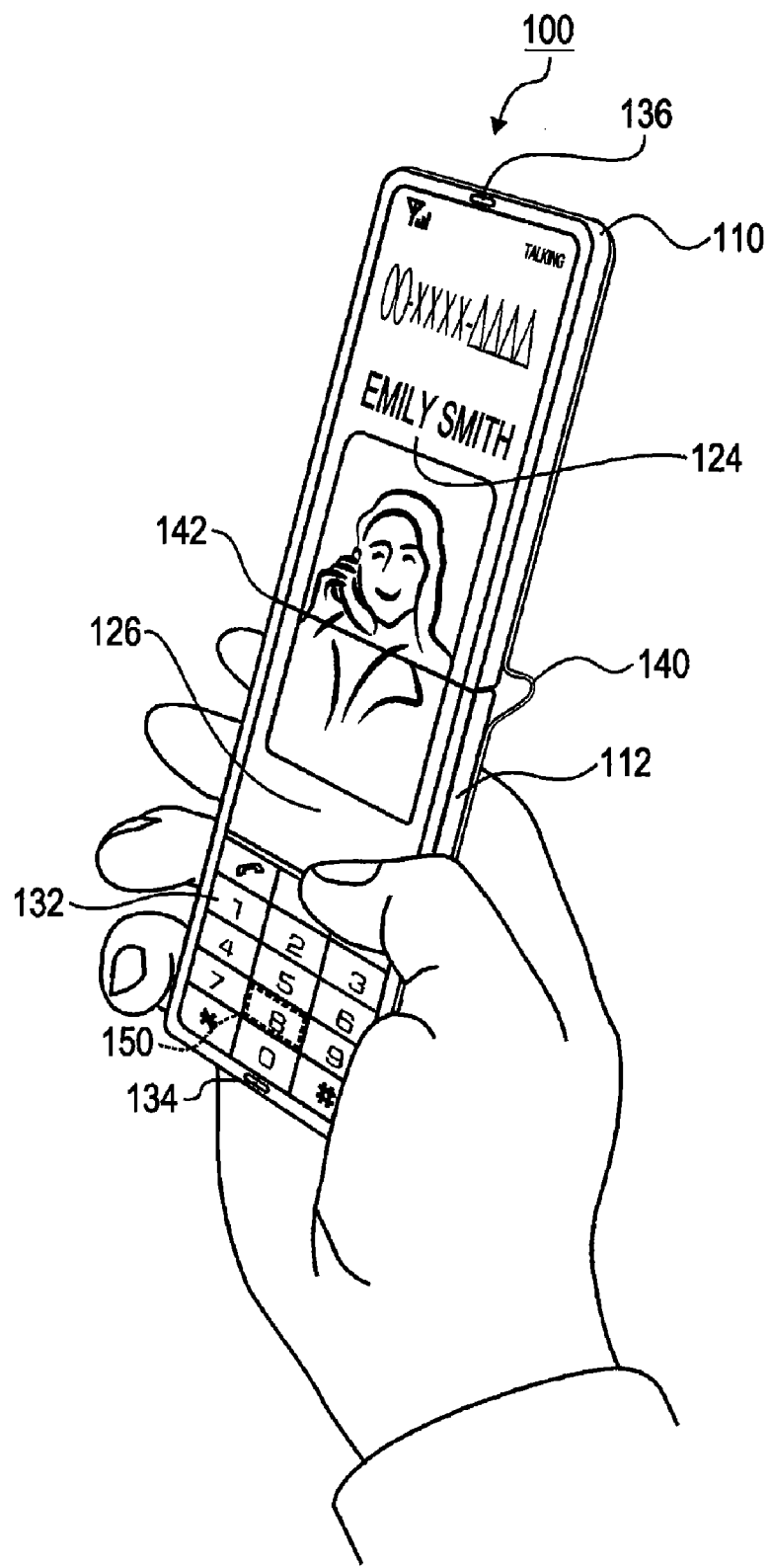
FIG. 2 is a perspective view of an exemplary mobile phone configuration, in accordance with one embodiment of the invention.

As shown in FIG. 2, in accordance with one embodiment of the invention, the first display 124 is formed substantially over the entirety of an inside surface of the first display casing 110. Similarly, the second display 126 is formed substantially over the entirety of an inside surface of the second display casing 112. When the first display casing 110 and the second display casing 112 are in an opened state, the first display casing 110 and the second display casing 112 are slidably brought in contact with each other at a contact portion 142, thereby being connected. This allows two displays, namely, the first and second displays 124 and 126, to operate as if the two displays were one display. In this manner, a screen having a display area equal to the sum of display areas of the first and second displays 124 and 126 is realized.

Although some traditional input interface keys (e.g., telephone number keys) are displayed on the second display 126 in the example shown in FIG. 2, this input interface may be set to be displayed temporarily. When the input interface is not displayed, the area utilized for displaying this input interface can be utilized as an area for displaying other images. Alternatively, the area occupied by this input interface may be decreased to provide a smaller input interface area than that shown in FIG. 2. In this way, a greater portion of the total display area may be utilized to display other images.

Referring back to FIG. 1, the connecting member 128 includes two rotation shafts 160 (see FIG. 3B) arranged in parallel to each other. The connecting member 128 connects the first and second display casings 110 and 112 with each other so that the first and second display casings 110 and 112 can rotate around the two respective rotation shafts 160. The connecting member 128 using such rotation shafts 160 is described in further detail below.

The connecting member 128 is connected to at least one of the first and second display casings 110 and 112 through a sliding mechanism. This sliding mechanism is described in further detail below. The sliding mechanism allows the first and second display casings 110 and 112 to move with respect to the connecting member 128, wherein portions of the connecting member 128 may be stored in openings provided in the first or second display casing 110 or 112, as described in further detail below. In one embodiment, when portions of the connecting member 128 are stored in openings or spaces provided in the first and second display casings 110 and 112, the connecting member 128 is hidden by the first display casing 110 or the second display casing 112 when a display side of the electronic device is being viewed.

The stored state detecting unit 130 detects whether the connecting member 128 is stored in the first display casing 110 and/or the second display casing 112. In one embodiment, when conductive portions of a connecting member 128 make electrical contact with respective conductive portions of first and second stoppers 196 and 198 (FIG. 4A), a closed circuit is formed, thereby generating a signal indicating that the connecting member 128 is stored within the casings 110 and 112. It is understood, however, that numerous other techniques may be employed to detect when the connecting member 128 is in a stored state. For example, conductive contacts may be formed at respective edges of the display casings 110 and 112 such that when the display casings 110 and 112 are brought together, a conductive connection is established between the casings 110 and 112, thereby allowing a current to flow and indicate that the connecting member 128 is in a stored or hidden condition. In a further embodiment, an ON/OFF switch of a power supply or an operating application or program of the mobile phone 100 may be controlled by the terminal controlling unit 120 in accordance with the stored state detected by the stored state detecting unit 130. With such a configuration, necessary folding and opening actions can be performed in association with ON/OFF control of the power supply and the operating application when the mobile phone is unused and used, respectively. Thus, the operation state of the power supply and the operating application can be changed rapidly and easily.

The touch panel 132 is formed of a transparent or semi-transparent material. In one embodiment, the touch panel 132 is arranged on the first display 124 and/or the second display 126 so that an operation screen of the first display 124 and/or the second display 126 can be seen. Such a touch panel 132 detects a user's performing an input operation (touching) at a position corresponding to an operation block 150 (FIG. 2) displayed on the first display 124 and/or the second display 126 and triggers execution of a function associated with this operation block 150.

In accordance with various embodiments, a touch screen attached on a top surface of the display 124 and/or 126 or a pressure-detecting touch panel attached on a top surface or a back surface of the display 124 and/or 126 may be used as the touch panel 132. Two methods, namely, a pressure sensitive method for sensing a change in pressure and an electrostatic method for detecting an electric signal caused by static electricity, are available as a touch sensing method of the touch panel 132.

In existing mobile phones, fixed operation keys have two roles of displaying functions associated with the operation keys and of triggering execution of the functions. The first display 124 and/or the second display 126 realize the former role of displaying the functions but do not realize the latter role of triggering execution of the functions. In this embodiment, the input interface is configured by letting the touch panel 132 have this latter role.

By realizing the input interface with a liquid crystal display that can freely change displayed functions, arrangement, and numerals, it is possible to form various input interfaces without limitations applied by the fixed operation keys. By employing such input interfaces, it is possible to handle many applications without increasing a physically occupied area necessary for operations, i.e., without decreasing the portability, and to improve the usability of the mobile phone 100.

The audio input unit 134 includes an audio recognition unit, such as a microphone. The audio input unit 134 converts a user's voice into an electric signal processable by one or more processors (not shown) in the mobile phone 100.

The audio output unit 136 includes a speaker. The audio output unit 136 converts an audio signal of a caller's voice, for example, received with the mobile phone 100 into a voice sound and outputs the sound. The audio output unit 136 can also output a ring tone, operation sounds of the input interface provided by the second display 126 and the touch panel 132, music, an alarm sound, etc. In one embodiment, a speaker provided at a position corresponding to that of the audio output unit 136 or other desired location may be utilized as a two-way speaker at the time of viewing of a TV using a large screen constituted by the first and second displays 124 and 126.

The wireless communication unit 138 wirelessly communicates with a base station 102 of a mobile phone network. In one embodiment, a time-division multiplexing method in which a plurality of time slots of a time-divided frame are assigned to channels of the mobile phone 100 in the base station 102 to perform the communication or the like is employed as such a wireless communication method.

The protecting member 140 is formed of a flexible skin member made from a flexible resin, plastic, elastomer or any other suitable known material. As shown in FIGS. 3A to 5D, in one embodiment, the protecting member 140 is adhered to a surface opposite to the display side of the first display casing 110 and the second display casing 112, and protects the mobile phone 100, particularly, the connecting member 128, from damage. The protecting member 140 reduces the load applied to the connecting member 128 by further providing a connecting element for the first and second display casings 110 and 112.

In this embodiment, the above-described connecting member 128 and the sliding mechanism allow the mobile phone 100 to provide a large screen that can split into two smaller screens when in a closed configuration. In one embodiment, when a mobile phone 100 is opened from a folded (closed) state, an action of rotating and sliding the first and second display casings 110 and 112 is performed in the course thereof.

Figure 3A:
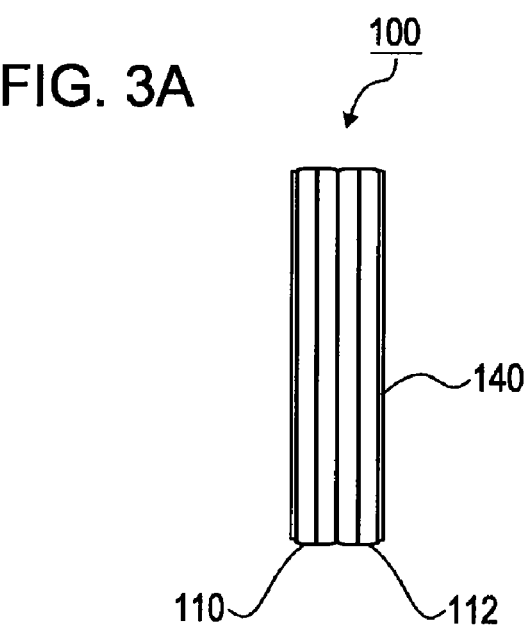
FIG. 3A illustrates a top view of a mobile phone in a closed configuration, in accordance with one embodiment of the invention.
Figure 3B:
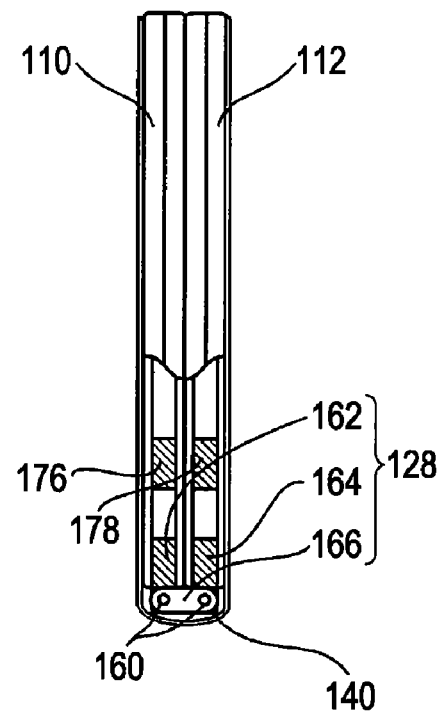
FIG. 3B illustrates a partial side cross-sectional view of the mobile phone of FIG. 3A.
Figure 4A:
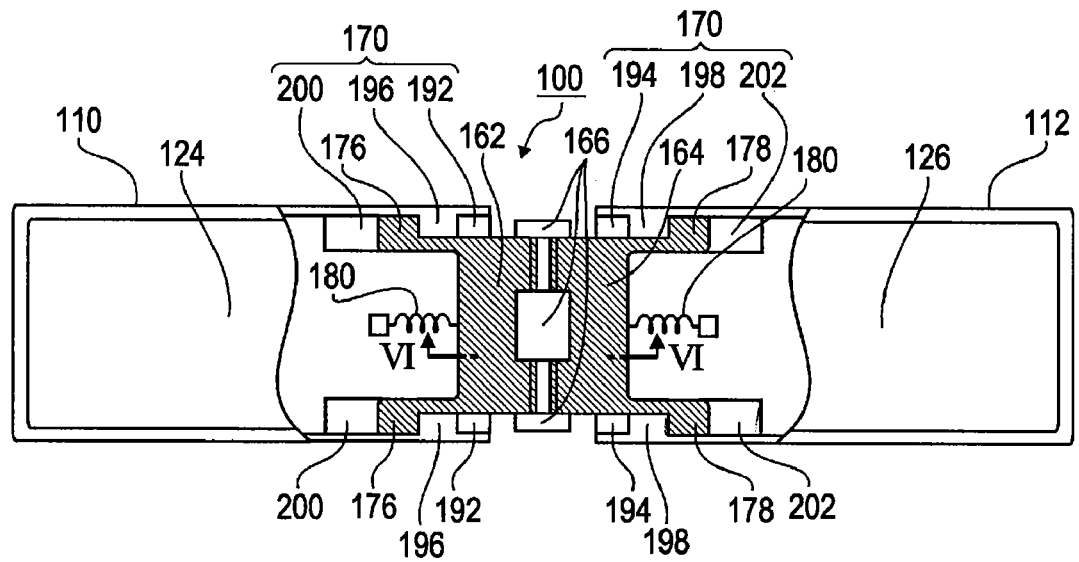
FIG. 4A is a cross-sectional view of a mobile phone in an open configuration, in accordance with one embodiment of the invention.
Figure 4B:
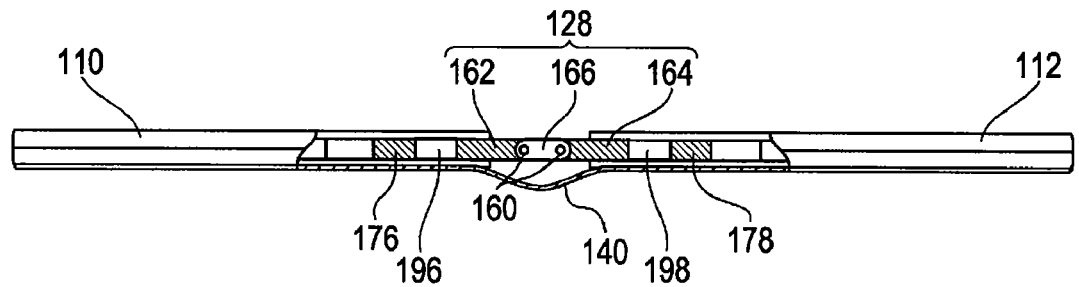
FIG. 4B is a side cross-sectional view of the mobile phone of FIG. 4A.

FIGS. 3A and 3B, FIGS. 4A and 4B, and FIGS. 5A to 5D are elevational views and side elevational views for illustrating a rotating and sliding action of the mobile phone 100, in accordance with various embodiments of the invention. FIGS. 3A and 3B illustrate a state where the first display casing 110 and the second display casing 112 of the mobile phone 100 are folded. FIGS. 4A and 4B illustrates a state where the first and second display casings 110 and 112 of the folded mobile phone 100 are opened by rotation. In particular, FIGS. 3A, 4A, 5A, and 5C show elevational views from a side that is opposite to the side of the connecting member 128, whereas FIGS. 3B, 4B, 5B, and 5D show left-side elevational views thereof. For ease of understanding, some internal structures are shown in a perspective manner in FIGS. 3A and 3B, FIGS. 4A and 4B, FIGS. 5A to 5D, and FIG. 6.

Referring to FIGS. 3A and 3B and FIGS. 4A and 4B, the connecting member 128 includes four kinds of components, namely, the two rotation shafts 160, a first rotational support member 162, a second rotational support member 164, and a middle portion 166. The first rotational support member 162 rotates along with the first display casing 110 and includes a pair of first connecting portion 176 attached to the first display casing 110 at designated areas of the first display casing 110, as shown in FIG. 4A, for example. The second rotational support member 164 rotates along with the second display casing 112 and includes a pair of second connecting portions 178 attached to the second display casing 112 at designated areas of the second display casing 112. The middle portion 166 connects the first rotational support member 162 and the second rotational support member 164 through the rotation shafts 160. In one embodiment, the connecting member 128 is electrically connected to the first and/or second display casings 110 and 112 through one or more wires (not shown) passing through the rotation shafts 160 and/or the middle portion 166. These wires provide electrical connectivity between the displays in each display casing 110 and 112 and the terminal controlling unit 120 or other operation unit of the mobile phone that controls operation of the displays. In alternative embodiments, any known method of providing such electrical connectivity (e.g., a serial or parallel bus) may be implemented and coupled to the connecting member 128 as would be apparent to one of ordinary skill in the art. Referring to FIGS. 3A and 3B, in a closed state, an angle between the first rotational support member 162 and the middle portion 166 and an angle between the second rotational support member 164 and the middle portion 166 are each equal to approximately 90 degrees.

The folded state shown in FIGS. 3A and 3B is employed while the mobile phone 100 is carried or not used by a user, for example. In one embodiment, in order to avoid unintentional opening of the first and second display casings 110 and 112, a lock mechanism for maintaining the folded state of the first and second display casings 110 and 112 may be provided. In various embodiments, an attractive force caused by magnets or an urging force caused by elastic members can be used as such a lock mechanism. For example, in one embodiment, the first and second connecting portions 176 and 178 each includes a magnet portion. In a closed state, the north pole of the magnet in the first connecting portion 176 faces the south pole of the magnet in the second connecting portion 178. In this configuration, the force between the two magnets provides a locking force that resists unintentional opening of the display casings 110 and 112.

Figure 3C:
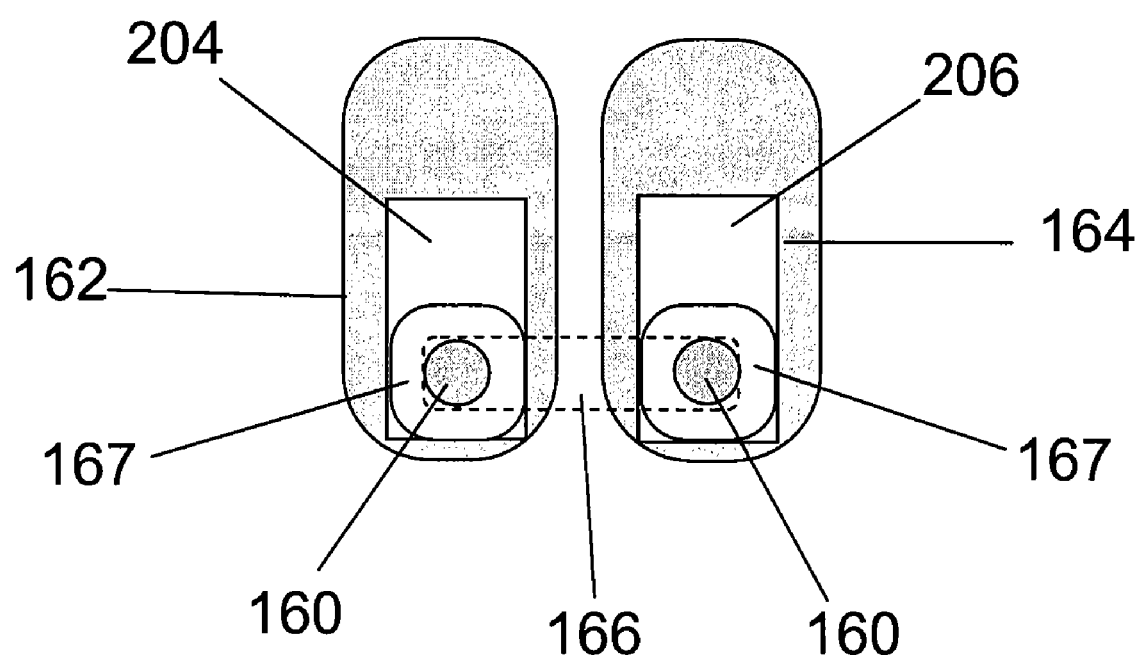
FIG. 3C illustrates a partial side cross-sectional view of a lock mechanism, in accordance with one embodiment of the invention.

Referring to FIG. 3C, a locking mechanism may further be provided by elastic members 167, which cover at least a portion of each rotating shaft 160. In the embodiment shown, the cross-sectional shape of the elastic member is approximately square with chamfered corners. The rotation shafts 160 and the elastic members 167 are configured to be stored in respective bearing holes 204 and 206 of the first and second rotational support members 162 and 164, respectively. In one embodiment, the cross-sectional shape of the holes 204 and 206 are rectangular to allow sliding of the rotation shafts 160 and the elastic members 167 therein. When the first and second display casing 110 and 112 are rotated between open and closed configurations, the first and second rotational support members 162 and 164 also rotate. This results in the corners of the elastic member 167 to hit the inner walls of their respective bearing holes 204 and 206, which results in an elastic pressing force that deforms the elastic members 167 and resists unintentional opening or closing of the casings 110 and 112. At 90 degrees of rotation, the pressing force is released again and a locked state is once again established. In this way, a user must overcome the pressing force to rotate the casings 110 and 112, thereby providing a lock mechanism.

In another embodiment, the cross-sectional shape of the elastic members 167 and their respective bearing holes 204 and 206 may be an octagon shape to provide a lock mechanism that provides resistance at every 45 degrees of rotation. In various embodiments, the elastic members 167 may be made of any suitable resin, elastomer, silicon or rubber, which provides a desired amount of elasticity and resists degradation and wear and tear.

Referring to FIGS. 4A and 4B, the angles between the first rotational support member 162 and the middle portion 166 and between the second rotational support member 164 and the middle portion 166 are changed from 90 degrees to 180 degrees, which makes an angle between the first display casing 110 and the second display equal to 180 degrees, so that the display casings form a single plane, thereby allowing the first and second displays 124 and 126 to be oriented in a single plane.

Thus, the two rotation shafts 160 allow the first and second rotational support members 162 and 164, and hence the first and second display casings 110 and 112, to be rotatably connected to each other and pivot about the connecting member 128. Thus, in an open state, the first and second display casings 110 and 112 can form an identical plane. In particular, as shown in FIG. 3B, it is preferable to position and orient the middle portion 166 such that it facilitates folding and unfolding of the display casings 110 and 112. In alternative embodiments, the number of rotation shafts may be two or more. For example, the connecting member 128 may have three rotation shafts to provide further rotational freedom of motion.

At this stage, the first and second display casings 110 and 112 are rotatable in the folding direction, i.e., are not fixed, and part of the connecting member 128 is exposed to the outside of the display casings. Accordingly, the first and second displays 124 and 126 are separated from one another.

On the other hand, the first and second display casings 110 and 112 form an identical plane, whereby respective portions of the connecting member 128 can fit into the first display casing 110 and the second display casing 112 when the first and second display casings 110 and 112 are slid toward each other to form a single larger display area. A sliding mechanism 170 allows the first and second display casings 110 and 112 to slide in a direction such that the first and second display casings 110 and 112 approach each other (hereinafter, referred to as the approaching direction).

The sliding mechanism 170 is arranged in the internal side of the first and second display casings 110 and 112 with respect to a surface on which the first and second display casings 110 and 112 touch each other by a sliding movement. In one embodiment, the first pair of connecting portions 176 are slidably engaged with respective third slide holes or channels 200 of display casing 110 and the second pair of connecting portions 178 are slidably engaged with respective fourth slide holes or channels 202 of display casing 112.

In one embodiment, the sliding mechanism 170 further includes six kinds of components, namely, a first slide hole portion 192, a second slide hole portion 194, a third slide hole portion 200, a fourth slide hole portion 202, a first stopper 196, and a second stopper 198. The first and second slide hole portions 192 and 194 store the middle portion 166 when the first and second display casings 110 and 112 are in contact with each other. The first and second slide hole portions 192 and 194 are provided in the first and second display casings 110 and 112, respectively. The third and fourth slide hole portions 200 and 202 store the first and second connecting portions 176 and 178 when the first and second display casings 110 and 112 slide in the approaching direction, respectively. The third and fourth slide hole portions 200 and 202 are provided in the first and second display casings 110 and 112, respectively. The first and second stoppers 196 and 198 restrict the longitudinal sliding movement of the first and second display casings 110 and 112 when the first and second display casings 110 and 112 are separated from one another by the sliding movement. The first and second stoppers 196 and 198 are provided in the first and second display casings 110 and 112, respectively. In the state shown in FIGS. 4A and 4B, the first and second stoppers 196 and 198 function in a separating direction of the first and second display casings 110 and 112 to restrict the sliding movement.

The sliding mechanism 170 allows the first and second display casings 110 and 112 to slide in the approaching direction, thereby bringing the first display casing 110 in contact with the second display casing 112 and forming a large screen with the first and second displays 124 and 126 as shown in FIGS. 5A to 5D. At this time, the middle portion 166 functions as a guide when the connecting member 128 fits into the first display casing 110 and the second display casing 112.

At this stage, the connecting member 128 is stored in and hidden by the first and second display casings 110 and 112. Ends 174 of the first and second display casings 110 and 112 touch each other, whereby the sliding movement thereof is limited. In this manner, the mobile phone 100 is shifted into a usable state. Since the first display 124 is connected to the second display 126, a user can obtain various kinds of information through a large screen.

Figure 5A:
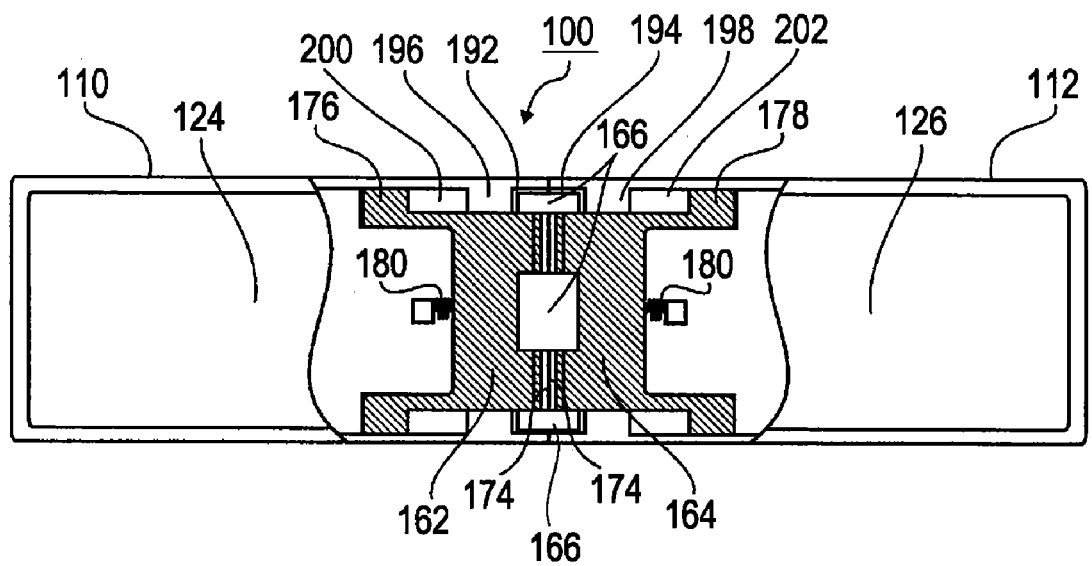
FIG. 5A is a cross-sectional view of a mobile phone in an open configuration having two display casings slidably engaged with each other, in accordance with one embodiment of the invention.
Figure 5B:
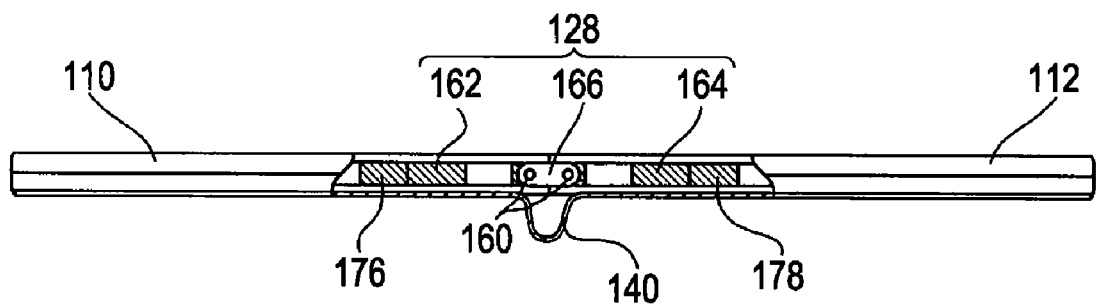
FIG. 5B is a side cross-sectional view of the mobile phone of FIG. 5A.
Figure 5C:
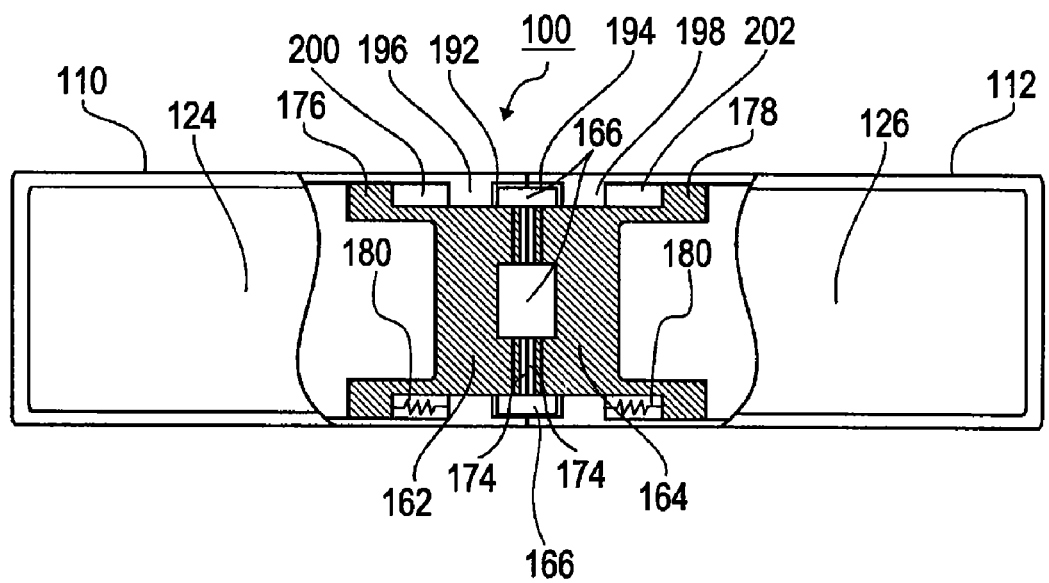
FIG. 5C is a cross-sectional view of a mobile phone in an open configuration having two display casings slidably engaged with each other, in accordance with another embodiment of the invention.
Figure 5D:
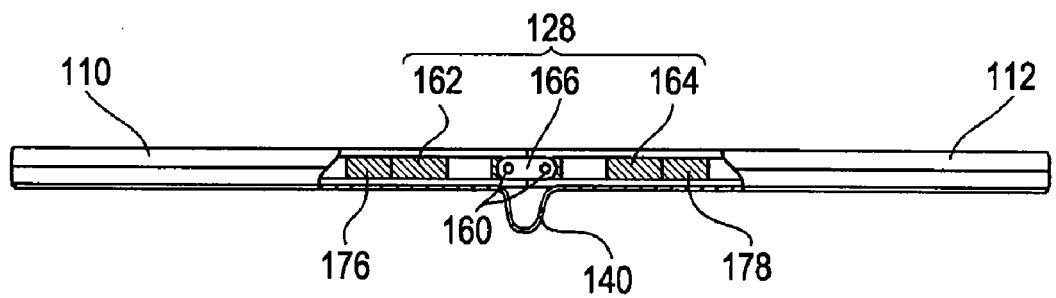
FIG. 5D is a side cross-sectional view of the mobile phone of FIG. 5C.

As shown in FIGS. 4A to 5D, the sliding mechanism 170 may include elastic members 180 that promote the sliding movement for connecting the first and second display casings 110 and 112 with an urging force. In one embodiment, the states shown in FIGS. 5A to 5D constitute a normal state (e.g., a state where a large force is not applied) where the force is not applied to the elastic members 180. On the other hand, the states shown in FIGS. 4A and 4B can be an extended state where elastic member 180 are stretched and therefore apply a force upon the first and second display casings 110 and 112 in the approaching direction. Although a spring is used as the elastic members 180 in this embodiment, the elastic members 180 are not limited to a spring, and a member, such as rubber, capable of applying the urging force can be appropriately used. As shown in FIGS. 5A and 5B, the elastic members 180 may be arranged so that the elastic members 180 pull together the first and second display casings 110 and 112 toward each other and the connecting member 128 in a direction that a distance therebetween is reduced (hereinafter, referred to as the inter-distance reducing direction). In an alternative embodiment, as shown in FIGS. 5C and 5D, the elastic members 180 may be arranged between connecting members 176, 178, on one hand, and stop members 196 and 198 on the other hand, so that the elastic members 180 pull the first and second display casings 110 and 112 and the connecting member 128 in the inter-distance reducing direction.

With such a configuration, when the mobile phone 100 is opened from the folded state, i.e., when the mobile phone 100 is changed into the state shown in FIGS. 4A and 4B from the state shown in FIGS. 3A and 3B, an urging force is automatically applied to the first and second display casing 110 and 112 in the approaching direction of the first and second display casings 110 and 112, and the first and second display casings 110 and 112 are automatically connected with each other.

Thus, elastic members 180 may function as a connection locking mechanism for maintaining the connection after the first and second display casings 110 and 112 are connected with each other. In further embodiments, magnet and/or other known mechanical components may be used as the connection locking mechanism in addition to the elastic members 180.

The connecting member 128 fits into the first and second display casings 110 and 112, whereby an outer surface of the middle portion 166 is abutted against inner surfaces of the first and second display casings 110 and 112. Accordingly, the rotation around the rotation shafts 160 is limited. Here, a highly rigid member, such as an ABS resin, may be used as the middle portion 166. Accordingly, the first and second display casings 110 and 112 are rigidly fixed and a large screen is maintained unless the display casings 110 and 112 are slid apart.

Although FIGS. 3A to 5D show transformation of the mobile phone 100 from the folded state to the opened state, an opposite operation can be performed to fold the mobile phone 100. More specifically, the first and second display casings 110 and 112 are separated from one another using the sliding mechanism 170. The first and second display casings 110 and 112 may then be folded using the connecting member 128 after the connecting member 128 abuts the first and second stoppers 196 and 198.

Figure 6:
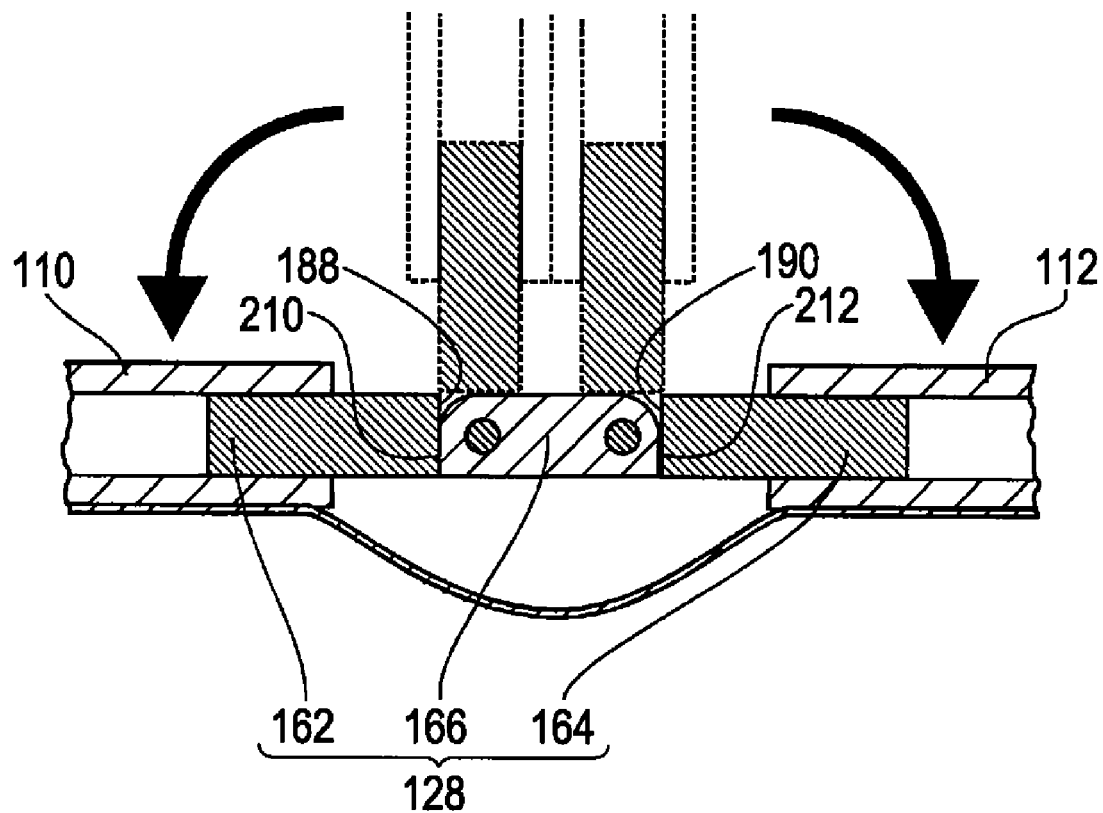
FIG. 6 is a cross-sectional side view of a rotating or pivoting mechanism, in accordance with one embodiment of the invention.

In one embodiment, the first and second rotational support members 162 and 164 and the middle portion 166 form a rotation limiting mechanism. FIG. 6 is a cross-sectional view (taken along a line VI-VI shown in FIG. 4A) for illustrating the rotation limiting mechanism. For example, when the state is changed from the state shown in FIGS. 3A and 3B into the state shown in FIGS. 4A and 4B, the rotation in directions of arrows shown in FIG. 6 is not disturbed until angles between the first rotational support member 162 and the middle portion 166 and between the second rotational support member 164 and the middle portion 166 become equal to approximately 180 degrees from 90 degrees. Upon the angles between the first rotational support member 162 and the middle portion 166 and between the second rotational support member 164 and the middle portion 166 becoming equal to 180 degrees, side faces 188 and 190 of the first and second rotational support members 162 and 164 in the 90-degree direction serving as the rotation limiting mechanism abut side faces 210 and 212 of the middle portion 166 in the 90-degree direction serving as the rotation limiting mechanism, respectively, thereby preventing the further rotation. In this manner, a 180-degree state that allows the connecting member 128 to easily fit into the first display casing 110 and the second display casing 112 is created.

As described above, in the mobile phone 100 according to the embodiment, the first and second displays 124 and 126 slide along with the first and second display casings 110 and 112. Accordingly, it is possible to form a large screen while maintaining a relatively compact size and providing a sophisticated appearance. Since the connecting member 128 is stored in the display casings as the display casings slide, a flat and simple structure having a sense of unity and high quality can be produced by preventing the connecting member 128 from being exposed.

Since a large frame of a display does not have to be formed in accordance with a length of the rotation shafts 160, it is possible to obtain a larger display area in a small electronic device in which a size of a display casing itself is limited.

Although embodiments of the present invention have been described with reference to the accompanying drawings in the above, it is understood that the present invention is not limited to the above-described embodiments. Various alterations and modifications to the above embodiments are contemplated to be within the scope of the invention. It should be understood that those alterations and modifications are included in the technical scope of the present invention as defined by the appended claims.

For example, although the invention has been described in the context of a mobile phone as an exemplary electronic devices, the invention can be embodied or utilized in many other types of electronic devices such as, for example, a PDA, a PC, a digital camera, a music player, a car navigation system, a television, a video game machine, a DVD player, a remote controller, and so on.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An electronic device comprising:
    two display casings each having a display included therein;
    a connecting member comprising two rotation shafts arranged in parallel to each other and coupled to respective ones of the two display casings so as to allow each of the two display casings to rotate toward each other to place the two display casings in a closed state, in which the displays of the two display casings substantially face each other, and rotate away from each other to place the two display casings in an open state, in which the displays of the two display casings are substantially in the same plane; and
    a sliding mechanism configured to allow respective sides of each of the two display casings to move toward each other and contact each other so as to allow the displays of the two display casings to form a single larger display area, wherein when the two display casings are in the open state and the respective sides of the two display casings are in contact with each other, the connecting member is fully enclosed within the two display casings, and when the two display casings are in a closed state, at least a portion of the connecting member is located outside of the two display casings.

2. The electronic device according to claim 1, wherein the connecting member comprises:
    two rotating support members rotatably coupled to the two rotation shafts, respectively, wherein the two rotating support members are further slidably coupled to the two display casings, respectively, such that the two display casings rotate along with the two rotating support members, respectively, when the two rotating support members rotate about the two rotation shafts, respectively; and
    a middle portion for holding the two rotation shafts in a parallel orientation with respect to each other.

3. The electronic device according to claim 2 wherein respective surfaces of the two rotating support members are configured to engage two respective surfaces of the middle portion to prevent rotational movement of the two rotating support members beyond a desired maximum amount of rotation when the electronic device is in a fully open configuration.

4. The electronic device according to claim 1, wherein the sliding mechanism comprises at least two elastic members coupled to the two display casings, respectively, for providing a force upon the two display casings in an approaching direction.

5. The electronic device according to claim 1 further comprising:
    a lock mechanism configured to maintain the two display casings in a folded state and prevent unintentional opening of the two display casings with respect to one another.

6. The electronic device according to claim 5 wherein the lock mechanism comprises two magnetic elements coupled to the two display casings, respectively, wherein the two magnetic elements impart a magnetic attraction force upon each other to hold the two display casings together in a folded state.

7. The electronic device according to claim 1, wherein each of the two display casings comprises at least one hole portion for storing and hiding respective portions of the connecting member when the electronic device is in a fully open state and the two display casings are connected together so that their respective displays form the larger display area.

8. The electronic device according to claim 7 wherein each of the two display casings comprises at least one stopper member for engaging respective portions of the two rotating support members so as to prevent sliding motion of the two display casings away from each other beyond a maximum desired distance.

9. The electronic device according to claim 5, further comprising:
    a stored state detecting unit that detects whether the connecting member is stored in the display casings; and
    a controlling unit that controls an ON/OFF switch of a power supply coupled to the electronic device, or controls an application program executed by the electronic device, based on whether the stored stated detecting unit indicates that the connecting member is stored in the display casings.

10. The electronic device according to claim 1 wherein at least one of the displays comprises a touch sensitive panel.

11. The electronic device according to claim 1, further comprising a protecting member coupled to respective outside surfaces of the two display casings, wherein the protecting member comprises a flexible material that flexes when the two display casings are moved with respect to one another as the electronic device is switched between closed and open configurations.

12. An electronic device comprising:
    a first display casing including a first display;
    a second display casing including a second display;
    a connecting member comprising a first rotation shaft and a second rotation shaft, wherein the first and second rotation shafts are oriented substantially parallel to each other;
    a first rotational support member coupled to the first rotation shaft and slidably coupled to the first display casing; and
    a second rotational support member coupled to the second rotation shaft and slidably coupled to the second display casing, wherein the first and second display casings are rotatable into open and closed configurations with respect to each other such that respective sides of each of the first and second display casings are configured to slide toward each other and contact each other when in the open configuration such that the first and second display may form a larger display area, and wherein when the first and second displays are in the open configuration and the respective sides of the first and second display casings are in contact with each other, the connecting member is fully enclosed within the first and second display casings, and when the first and second display casings are in a closed state, at least a portion of the connecting member is located outside of the first and second display casings.

13. The electronic device of claim 12 wherein
    the first rotational support member comprises a first pair of connecting portions slidably coupled to the first display casing; and
    the second rotational support member comprises a second pair of connecting portions slidably coupled to the second display casing.

14. The electronic device of claim 12 wherein:
the first display casing comprises a first hole portion for storing a respective first portion of the connecting member; and
the second display casing comprises a second hole portion for storing a respective second portion of the connecting member, wherein when the electronic device is in a fully open state and the first and second display casings are slid together such that the first and second displays form the larger display area, the connecting member is stored and fully hidden by the first and second display casings.

15. The electronic device of claim 12, further comprising a stored state detecting unit that detects whether the connecting member is stored in the first and second display casings.

16. The electronic device of claim 15 further comprising a control unit that controls a ON/OFF switch of a power supply that supplies power to the electronic device based on whether the stored stated detecting unit indicates that the connecting member is stored in the first and second display casings.

17. The electronic device of claim 15 further comprising a control unit that controls an application program executed by the electronic device based on whether the stored stated detecting unit indicates that the connecting member is stored in the first and second display casings.

18. The electronic device of claim 12 wherein the first and second displays each comprise a touch screen panel.

19. The electronic device of claim 12 further comprising a protecting member coupled to respective outside surfaces of the first and second display casings, wherein the outside surfaces are opposite to display surfaces of the first and second displays, respectively.

20. The electronic device of claim 19 wherein the protecting member comprises a flexible material that flexes when the two display casings are moved with respect to one another as the electronic device is switched between closed and open configurations.

21. The electronic device of claim 1, further comprising:
two elastic members around each of the two rotating shafts, respectively, each having a substantially polygonal cross section.

22. The electronic device of claim 12, further comprising:
a first elastic member and a second elastic member around each of the first and second rotating shafts, respectively, each having a substantially polygonal cross section.

23. The electronic device of claim 3, wherein the respective surfaces of each of the rotation support members rotate along an outer surface of the middle portion.

24. The electronic device of claim 12, wherein respective surfaces of each of the first and second rotation support members rotate along an outer surface of a middle portion.

* * * * *